(12) United States Patent
Meurou et al.

(10) Patent No.: US 6,942,276 B2
(45) Date of Patent: Sep. 13, 2005

(54) VEHICLE DOOR INCLUDING A CABLE HARNESS

(75) Inventors: Francois-Paul Meurou, Sceaux du Gatinais (FR); Emmanuel Huber, Olivet (FR); Michel Mounie, St. Florent le Jeune (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 0 days.

(21) Appl. No.: 10/824,773

(22) Filed: Apr. 15, 2004

(65) Prior Publication Data

US 2004/0217624 A1 Nov. 4, 2004

(30) Foreign Application Priority Data

Apr. 18, 2003 (FR) .............................. 03 04880

(51) Int. Cl.$^7$ .................................................. B60J 5/00
(52) U.S. Cl. ................. 296/146.1; 296/208; 296/146.5; 296/146.9
(58) Field of Search ............................ 296/208, 146.1, 296/146.2, 146.5, 146.9

(56) References Cited

U.S. PATENT DOCUMENTS 4,943,109 A * 7/1990 Skrbina et al. .......... 296/146.6
5,749,176 A    5/1998 Heim et al.
6,185,872 B1   2/2001 Seeberger et al.
2002/0171257 A1 * 11/2002 Raisch et al. .......... 296/107.04

FOREIGN PATENT DOCUMENTS

| DE | 38 42 340 | 6/1990 |
| EP | 0 866 201 | 9/1998 |
| FR | 2 668 569 | 4/1992 |
| FR | 2 758 113 | 7/1998 |
| GB | 2 301 622 | 12/1996 |

OTHER PUBLICATIONS

French Search Report dated Dec. 8, 2003.

* cited by examiner

*Primary Examiner*—Jason Morrow
(74) *Attorney, Agent, or Firm*—Carlson, Gaskey & Olds

(57) ABSTRACT

A vehicle door includes a hollow box section, a window glass module projecting from the hollow box section, and a cable harness near the region where the window glass module exits from the hollow box section. A sub-assembly including the window glass module and a window regulator is introduced inside the hollow box section through an opening. The cable harness powers electrical components (such as a window regulator inside the door) and can then be introduced into the hollow box section through the opening without forming a supplementary opening through the door edge and require the operator to work blindly. The cable harness connects to the electrical components of the door more simply and less expensively.

17 Claims, 4 Drawing Sheets

FIG_1

FIG_2

FIG_3

VEHICLE DOOR INCLUDING A CABLE HARNESS

This application claims priority to French Patent Application FR 03 04 880 filed on Apr. 18, 2003.

TECHNICAL FIELD

The present invention relates generally to a vehicle door including a cable harness located near a region where a window glass module projects from a hollow box section.

BACKGROUND OF THE INVENTION

Vehicle doors can include electrically-powered equipment, the electrical supply originating from the vehicle. A cable harness passes from the vehicle body to the door through the door edge. A hole between the door hinges in the door edge can be provided for passage of the cable harness. A seal can be provided between the vehicle body and the door.

There are several drawbacks to this vehicle door. In some cases, it is difficult to gain access to the inside of the door to manually introduce the cable harness once the door is assembled. The operator positions the harness blindly using one hand, which can result in poor assembly quality. The hole in the edge of the passenger compartment also needs to be large enough to allow passage of the connectors. Further, providing the seal between the vehicle body and the door is expensive and complex, as it is made from numerous compartments.

French patent application 2,758,113 discloses a vehicle door including a sealing sleeve applied to an edge of the door where the door is hinged on the vehicle body. A channel in the sheet metal of the door defines a passage for the sleeve. There are several drawbacks to this door. For one, the door and the sleeve are complex. It is also time-consuming to create the channel in the metalwork of the door.

The present invention provides a method of electrically connecting the electrical components of the door to the body of the vehicle in a manner that is simpler and less expensive than the prior art.

SUMMARY OF THE INVENTION

The vehicle door of the present invention includes a hollow box section, a window glass module projecting from the hollow box section, and a cable harness near a region where the window glass module exits the hollow box section. The cable harness preferably runs from the vehicle bodywork.

The door can further include a retainer that maintains the cable harness in place in the region where the window glass module exits the hollow box section. The retainer can be a hook member or a molding.

The door can further include a trim, and the cable harness is located between the trim and the hollow box section. The cable harness preferably runs behind the trim in the region where the window glass module exits the hollow box section. The door can further include a motor and gear mechanism between the trim and the hollow box section of the door. The motor and gear mechanism are powered from the cable harness.

The door can further include a door edge and a seal or molding. The cable harness runs along the door edge, and the seal or molding masks the cable harness along the door edge. Alternatively, the cable harness and seal or molding are co-extruded. In one embodiment, the cable harness is secured inside the seal or molding. Alternatively, the seal or molding is molded over the cable harness. In a further embodiment, seal or molding secures the cable harness to the door edge.

Further characteristics and advantages of the invention will become clearer from the description which follows of some embodiments of the invention provided solely by way of example and with reference to the drawings.

DETAILED DESCRIPTION OF PREFERRED EMBODIMENTS

Figure 1:
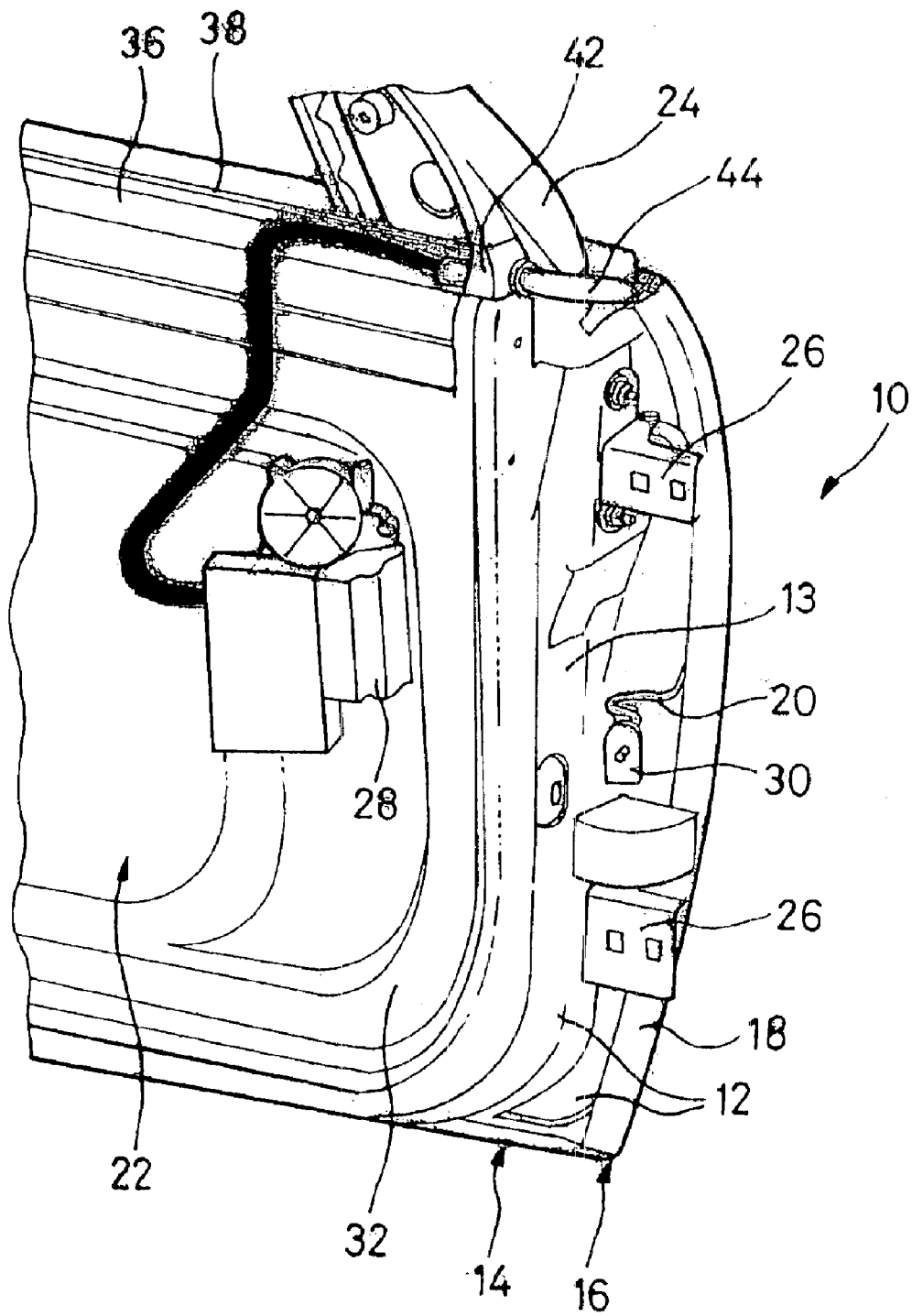
FIG. 1 schematically illustrates a vehicle door.
Figure 2:
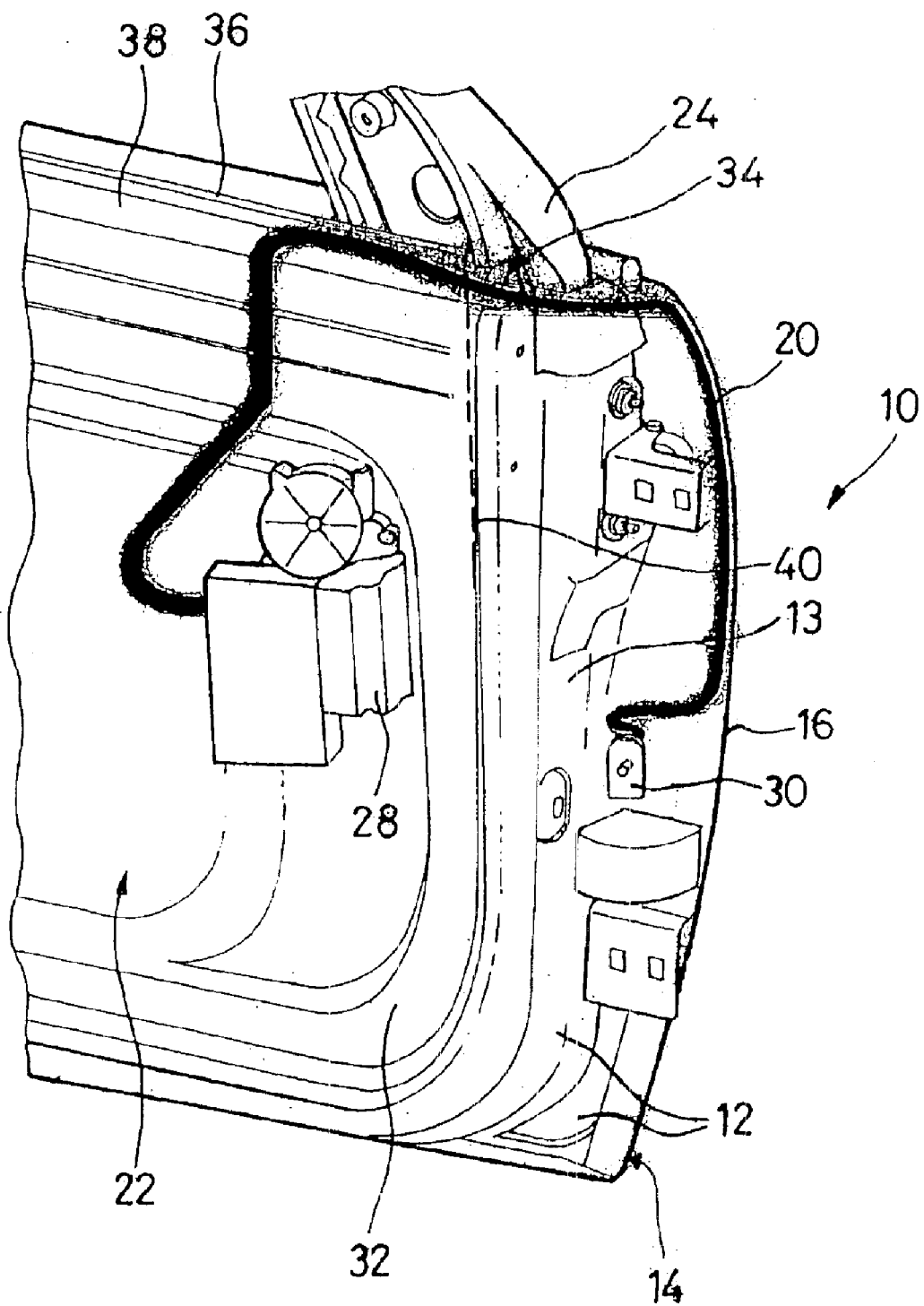
FIG. 2 schematically illustrates another view of the vehicle door.

A vehicle door 10, shown partially and by way of example in FIGS. 1 and 2, includes an inner skin 12 and an outer skin 14. The outer skin 14 can be the vehicle bodywork. The inner skin 12 and the outer skin 14 can be rendered integral, for example, by crimping the outer skin 14 onto the inner skin 12. The vehicle door 10 can be hinged on the vehicle body by hinges 26. The vehicle door 10 can include a hollow box section 22, the walls of the hollow box section 22 being the inner skin 12 and the outer skin 14. The hollow box section 22 is a wet zone in which equipment, such as a window lifter, can be mounted. By way of the walls, the hollow box section 22 not only includes the skins 12, 14, but also a support plate 32. The support plate 32 defines the frontier between the wet zone in the hollow box section 22 and a dry zone on the side of the vehicle door 10 directed towards the passenger compartment. The outer skin 14 and the support plate 32 form the faces of the hollow box section 22, and the inner skin 12 connects the outer skin 14 and the support plate 32. The inner skin 12 forms an edge 13 of the hollow box section 22 and of the vehicle door 10. In FIGS. 1 and 2, the hinges 26 are secured on the edge 13 of the hollow box section 22 and, consequently, on the edge 13 of the vehicle door 10.

The vehicle door 10 can include electrical equipment, such as an electric window lifter or regulator, an electric door handle and lock, and a loudspeaker, etc. In FIG. 1, a motor and gear mechanism 28 that operates the window lifter is illustrated as an example of the electric equipment. The motor and gear mechanism 28 is powered from a cable harness 20 originating from an orifice 30 in the vehicle body. If the support plate 32 completely closes off the zone, the motor and gear mechanism 28 can be mounted in the dry zone and drive a window regulator in the wet zone. The motor and gear mechanism 28 can then be secured onto the support plate 32 in the dry zone and drive, and the window regulator is located inside the hollow box section 22.

The vehicle door 10 can further include a window glass module 24, such as a window glass carrier and regulator. For example, the window glass module 24 can be a subassembly introduced inside the hollow box section 22 through an opening 38. One part of the window glass module 24 projects from the hollow box section 22, and the window glass module 24 is secured to the hollow box section 22. The part of the window glass module 24 that projects from the hollow box section 22 is, for example, a window glass frame that guide the window glass when outside the hollow box section 22. The part of the window glass module 24 that projects from the hollow box section 22 can also be only the rear view mirror support.

The cable harness 20 extends along an edge 16 of the vehicle door 10. A seal or molding 18 masks the cable harness 20 along the edge 16. Therefore, the cable harness 20 can be protected along the region of the vehicle door 10 which is not proximate to the orifice 30.

The edge 16 can be any edge of the door. In FIG. 1, the cable harness 20 runs along the edge 16 extending along the edge 13 of the vehicle door 10 that carries the hinges 26. Once the vehicle door 10 is mounted on the vehicle, the edge 16 corresponds to the edge 13 of the vehicle door 10. However, it is to be understood that the cable harness 20 can extend along an edge on another side of the vehicle door 10. The edge 16 can be formed by crimping the outer skin 14 to the inner skin 12.

The seal or molding 18 seals between the vehicle door 10 and another part of the vehicle, such as a wing, another door, or a mid-post. The seal or molding 18 extends along the edges of the vehicle door 10, at least in the lower portion of the vehicle door 10 occupied by the hollow box section 22. In FIG. 1, the seal or molding 18 extends along the edge 16 of the vehicle door 10. The cable harness 20 emerging from the orifice 30 can be masked along the edge 16 right up to the window glass module 24. The cable harness 20 can then be subsequently introduced into the hollow box section 22 through the opening 38 in the hollow box section 22 in which the window glass module 24 is introduced. Thus, the cable harness 20 can be directed towards the electrical equipment in the vehicle door 10 without having to form a supplementary opening through the edge 13 of the vehicle door 10 and provide a particular shaping of the walls of the hollow box section 22. The electrical units in the vehicle door 10 can be connected electrically to the remainder of the vehicle in a simpler and less expensive fashion. Further, by using the seal or molding 18 to mask the cable harness 20, a complex and expensive seal that joins the orifice 30 and the edge 13 of the vehicle door 10 is not needed.

The cable harness 20 can be fitted with a protective sheath between the orifice 30 and the seal or molding 18. The cable harness 20 forms an S shape between the orifice 30 and the seal or molding 18 to allow the vehicle door 10 to be opened without the risk of tearing, particularly of the seal or molding 18.

The seal or molding 18 can be fixed to the cable harness 20 along the edge 16. Thus, the seal or molding 18 guides and protects the cable harness 20 along the door edges. Alternatively, the cable harness 20 is secured to the edge 16 by some means other than the seal or molding 18, the latter simply covering the cable harness 20. This allows simultaneous securing of the cable harness 20 onto the edge 16, the vehicle door 10 or the hollow box section 22 and the covering (for aesthetic and sealing purposes) of the cable harness 20 by the seal or molding 18. This solution saves time when assembling the vehicle door 10 and enhances robustness of assembly because the operator is no longer required to perform operations blindly. The cable harness 20 can be integrally molded or co-extruded with the seal or molding 18 to create one single sub-assembly instead of several parts to be assembled. This further shortens assembly time of the vehicle door 10 and reduces the number of parts. Alternatively, clips along the edge 16 and underneath the clamping area can hold or secure the cable harness 20 along the edge 16. The latter can include a channel inside which the cable harness 20 is trapped. The seal or molding 18 can also include a finishing lip to improve sealing between the vehicle door 10 and the remainder of the vehicle (e.g., another door or vehicle wing).

The cable harness 20 can be fastened inside the seal or molding 18. Thus, the cable harness 20 is placed inside the seal or molding 18 without being produced at the same time. This can be done using additional clips in the seal or molding 18 which are clipped over the cable harness 20, or using a split lip into which the cable harness 20 is introduced.

FIG. 2 shows the vehicle door 10 of a vehicle without the seal or molding 18 masking the cable harness 20. The vehicle door 10 includes the hollow box section 22 and the window glass module 24 projecting from the hollow box section 22. The cable harness 20 can be close to the point where window glass module 24 exits the hollow box section 22. When the window glass module 24 is introduced into the hollow box section 22, there is a break in the line of sealing between the hollow box section 22 and the window glass module 24, in particular, where the part of the window glass module 24 projects outside the hollow box section 22. The cable harness 20 extends along the window glass module 24 at the point of exit from hollow box section 22. Thus, the cable harness 20 can supply the electrical equipment without supplementary metalworking, hole cutting or metal pressing operations on the vehicle door 10. This allows the electrical components in the vehicle door 10 to be electrically connected to the vehicle body more simply and robustly.

FIG. 2 highlights the break in the line of sealing of the vehicle door 10. The window glass module 24 projects from the hollow box section 22 via the opening 38 in the hollow box section 22. A sealing line extends along the projecting window glass module 24 and the hollow box section 22 and adapts to irregularities in the vehicle door 10. The window glass module 24 projecting from the hollow box section 22 includes a set-back portion 34 above the hollow box section 22. The set-back portion 34 consequently interrupts continuity of the door sealing line. The cable harness 20 can now be applied where the window glass module 24 exits the hollow box section 22 and through the set-back portion 34. More particularly, the hollow box section 22 includes a wall 36 extending above an anti-intrusion bar of the vehicle door 10 (not shown). The anti-intrusion bar increases rigidity of the vehicle door 10 in the event of an accident. The opening 38 for introducing the window glass module 24 is in the wall 36, and the set-back portion 34 is above the wall 36. Consequently, the cable harness 20 extends along the junction between the projecting portion of the window glass module 24 and the hollow box section 22. The cable harness 20 fits into the set-back portion 34 between the projecting portion of the window glass module 24 and the hollow box section 22.

The vehicle door 10 can further include a trim 40, shown diagrammatically as dashed lines in FIG. 2. The trim 40 lines the inside of the vehicle door 10 and can be applied against the hollow box section 22. The hollow box section 22 encloses the wet zone, the wet zone being separated from the dry zone by the support plate 32. The support plate 32 carries equipment (such as the motor and gear mechanism 28) situated in the dry zone. The trim 40 covers the support plate 32 and hides the equipment. The trim 40 is fastened to the hollow box section 22 at the wall 36 and covers the wall 36 along the opening 38 and up to the set-back portion 34 of the window glass module 24. The trim 40 also covers the support plate 32 and extends along the edge 13 of the vehicle door 10.

The cable harness 20 passes between the trim 40 and the hollow box section 22. Thus, the cable harness 20 can electrically connect the equipment supported by the support plate 32 and hidden by the trim 40 without additional tooling operations needed on the vehicle door 10. By being close to the point where window glass module 24 exits from the hollow box section 22, the cable harness 20 faces the trim 40 beneath which it can be introduced.

Figure 3:
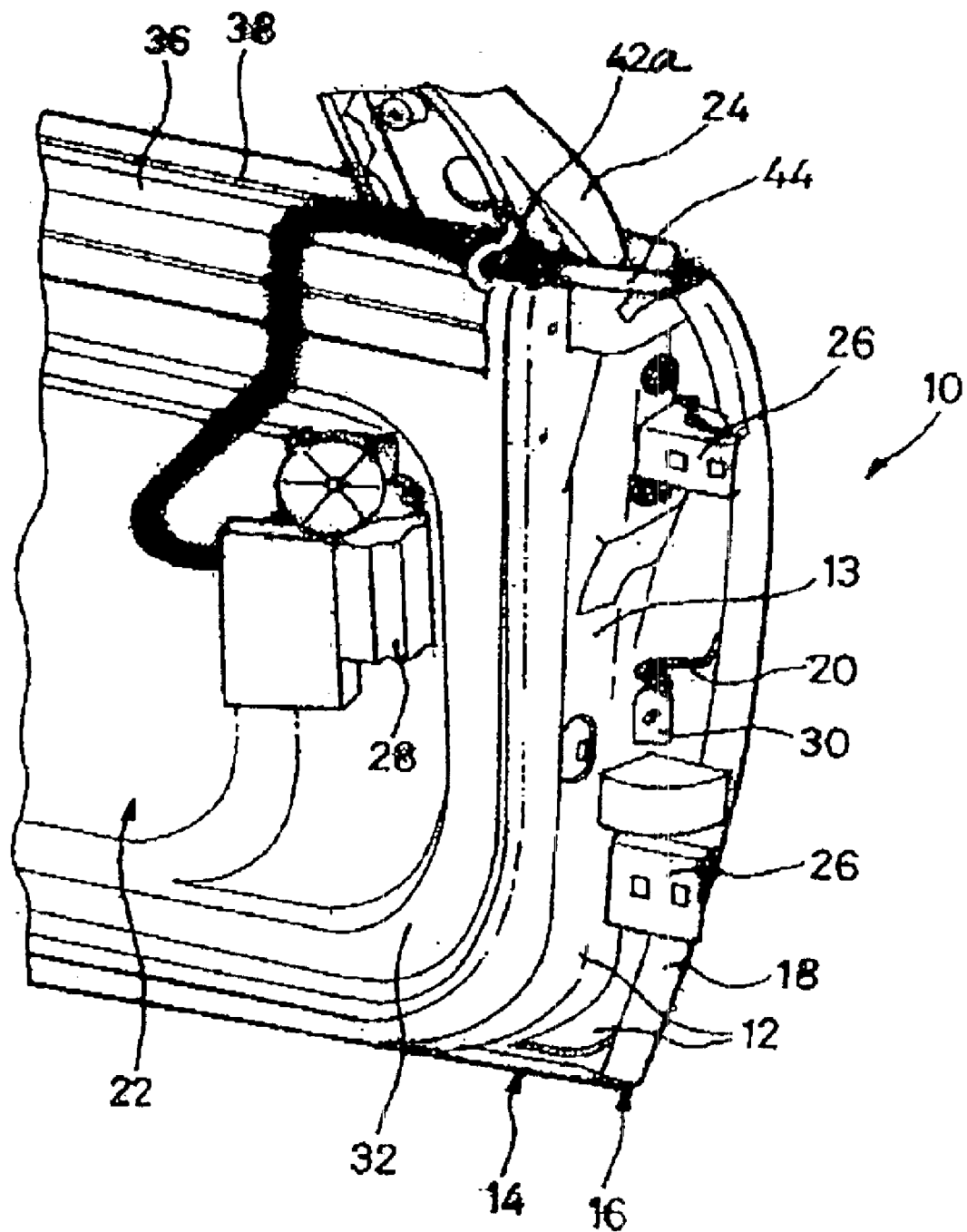
FIG. 3 schematically illustrates a vehicle door including a hook as a retainer.
Figure 4:
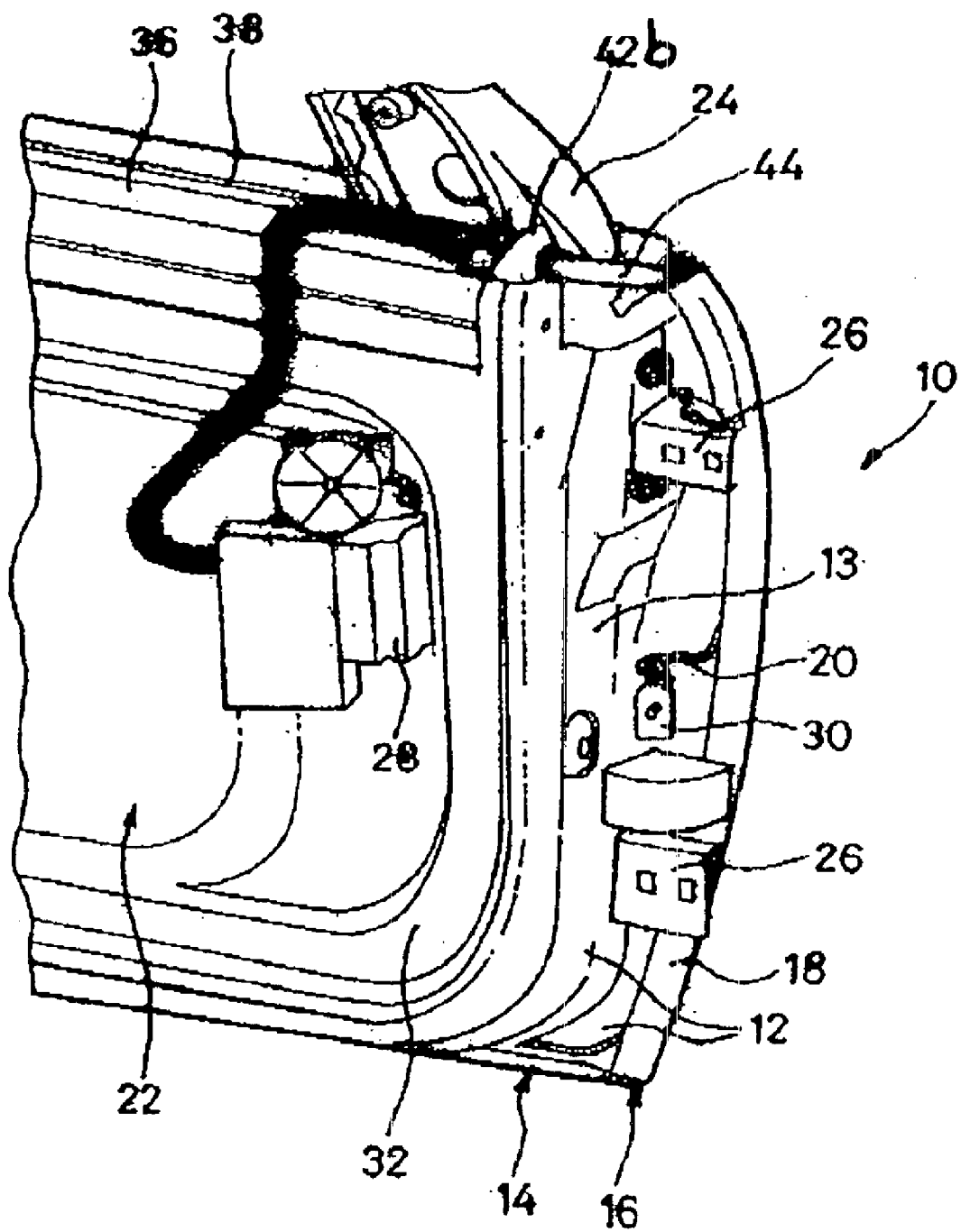
FIG. 4 schematically illustrates a vehicle door including a molding as a retainer.

In FIG. 1, the vehicle door 10 includes a retainer 42 which hides and maintains the cable harness 20 in place where the window glass module 24 exits the hollow box section 22. In one example, as shown in FIG. 3, the retainer 42 is a hook member 42a, such as a clip, that grips the cable harness 20. The retainer 42 can also be a foamed material. Alternatively, as shown in FIG. 4, the retainer 42 can be a specific molding 42b that allows the cable harness 20 to be immobilized and the continuity of the sealing line to be maintained. The retainer 42 can close off the set-back portion 34.

Where window glass module 24 leaves the hollow box section 22, the cable harness 20 can be provided with a protective sleeve 44, like the one used between the orifice 30 and the seal or molding 18. The protective sleeve 44 also protects the cable harness 20 between the seal or molding 18 and the point where window glass module 24 leaves the hollow box section 22. The protective sleeve 44 can extend through the set-back portion 34. The retainer 42 mates with the protective sleeve 44.

The features relating to masking of the cable harness 20 by the seal or molding 18 can be considered independently of the other features of the vehicle door 10, notably the constitution of the vehicle door 10 by the inner skin 12 and the outer skin 14. In particular, the masking by the seal or molding 18 can be considered independently of the cable harness 20 at the point where window glass module 24 leaves the hollow box section 22. Masking of the cable harness 20 along the edge 16 makes it possible to offset and protect the cable harness 20 along the vehicle door 10 where the cable harness 20 leaves the vehicle body through the orifice 30. This makes it possible to subsequently connect the electrical units of the vehicle door 10 and take advantage of some already existing shaping in the vehicle door 10, such as the opening 38 for the passage of the window glass module 24. Thus, the electrical units of the vehicle door 10 can be connected more simply and less expensively.

Further, the features relating to the cable harness 20 at the point where window glass module 24 leaves the hollow box section 22 can also be considered independently of the other characteristics of the vehicle door 10, notably the constitution of the vehicle door 10 by the inner skin 12 and the outer skin 14. In particular, the cable harness 20 at the point where window glass module 24 leaves the hollow box section 22 can be considered independently of the masking of the cable harness 20 by the seal or molding 18 along the edge 16. By locating the cable harness 20 where the window glass module 24 leaves the hollow box section 22, it is possible to take advantage of a shaping present in the vehicle door 10 for introducing the electrical supply independently of the path the cable harness 20 has followed previously. For example, the orifice 30 in the bodywork can open up at the height of the door anti-intrusion bar. Thus, the electrical components in the vehicle door 10 can be connected more simply and less expensively.

The vehicle door 10 (including the cable harness 20 masked along the edge 16 by the seal or molding 18 and the cable harness 20 which is at the point where window glass module 24 leaves hollow box section 22) makes it possible to offset and protect the cable harness 20 along the vehicle door 10 and then to take advantage of the break in the door sealing line. Thus, the orifice 30 can be left where it is or shifted above the hinge axis, and the passage of the cable harness 20 along the vehicle door 10 does not require any particular supplementary shaping of the vehicle door 10. Thus, the electrical components of the vehicle door 10 can be connected more simply and less expensively.

Obviously, this invention is not limited to the embodiments described by way of example. Thus, the break in the door sealing line is not limited to the set-back portion 34 described. Nor is the vehicle door 10 itself limited to the structure described. Further, the vehicle door 10 is not limited to having a side opening.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vehicle door module for a vehicle door having a door edge, the vehicle door module comprising:
   a hollow box section;
   a window glass module projecting from the hollow box section at a region where the window glass module exits the hollow box section; and
   a cable harness originating from a vehicle body and extending along the window glass module near the region where the window glass module exits the hollow box section.

2. The door module according to claim 1, wherein the cable harness runs from a vehicle bodywork.

3. The door module according to claim 1, further comprising a retainer which retains the cable harness in the region where the window glass module exits the hollow box section.

4. A vehicle door module for a vehicle door having a door edge, the vehicle door module comprising:
   a hollow box section;
   a window glass module projecting from the hollow box section at a region where the window glass module exits the hallow box section;
   a cable harness near the region where the window glass module exits the hollow box section; and
   a retainer which retains the cable harness in the region where the window glass module exits the hollow box section, wherein the retainer is a hook.

5. The door module according to claim 3, wherein the retainer is a molding.

6. The door module according to claim 1, further comprising a trim, and the cable harness is located between the trim and the hollow box section.

7. The door module according to claim 6, wherein the cable harness runs behind the trim in the region where the window glass module exits the hollow box section.

8. The door module according to claim 6, further comprising a motor and gear mechanism located between the trim and the hollow box section, and the motor and gear mechanism is powered from the cable harness.

9. A vehicle door module for a vehicle door having a door edge, the vehicle door module comprising:
- a hollow box section;
- a window glass module projecting from the hollow box section at a region where the window glass module exits the hollow box section;
- a cable harness near the region where the window glass module exits the hollow box section;
- a door edge, wherein the cable harness runs along the door edge; and
- a seal that masks the cable harness along the door edge.

10. The door module according to claim 9, wherein the seal secures the cable harness along the door edge.

11. The door module according to claim 9, wherein the cable harness and seal are co-extruded.

12. The door module according to claim 9, wherein the cable harness is secured inside the seal.

13. The door module according to claim 9, wherein the seal is molded over the cable harness.

14. The door module according to claim 9, wherein the cable harness is secured to the door edge.

15. The door module according to claim 9, wherein the cable harness runs from a vehicle bodywork.

16. The door module according to claim 10, wherein the cable harness runs from a vehicle bodywork.

17. The door module according to claim 11, wherein the cable harness runs from a vehicle bodywork.

* * * * *

UNITED STATES PATENT AND TRADEMARK OFFICE
CERTIFICATE OF CORRECTION

PATENT NO. : 6,942,276 B2 Page 1 of 1
DATED : September 13, 2005
INVENTOR(S) : Meurou et al.

It is certified that error appears in the above-identified patent and that said Letters Patent is hereby corrected as shown below:

Column 6,
Line 50, "hallow" should read as -- hollow --.

Signed and Sealed this

Fifteenth Day of November, 2005

JON W. DUDAS
*Director of the United States Patent and Trademark Office*